(12) United States Patent
Zhang et al.

(10) Patent No.: US 12,516,393 B2
(45) Date of Patent: Jan. 6, 2026

(54) HIGH STRENGTH, HIGH-TEMPERATURE CORROSION RESISTANT MARTENSITIC STAINLESS STEEL AND MANUFACTURING METHOD THEREFOR

(71) Applicant: BAOSHAN IRON & STEEL CO., LTD., Shanghai (CN)

(72) Inventors: Chunxia Zhang, Shanghai (CN); Zhonghua Zhang, Shanghai (CN); Yameng Qi, Shanghai (CN); Peng Zhao, Shanghai (CN); Qilin Liu, Shanghai (CN); Jimei Zhao, Shanghai (CN); Meng Luo, Shanghai (CN); Haiyan Cai, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 543 days.

(21) Appl. No.: 17/919,791

(22) PCT Filed: Apr. 26, 2021

(86) PCT No.: PCT/CN2021/090024
§ 371 (c)(1),
(2) Date: Oct. 19, 2022

(87) PCT Pub. No.: WO2021/218932
PCT Pub. Date: Nov. 4, 2021

(65) Prior Publication Data
US 2023/0167522 A1 Jun. 1, 2023

(30) Foreign Application Priority Data
Apr. 30, 2020 (CN) .......................... 202010363059.2

(51) Int. Cl.
| | |
|---|---|
| C22C 38/44 | (2006.01) |
| C21D 1/18 | (2006.01) |
| C21D 6/00 | (2006.01) |
| C21D 9/08 | (2006.01) |
| C22C 38/00 | (2006.01) |
| C22C 38/02 | (2006.01) |
| C22C 38/04 | (2006.01) |
| C22C 38/06 | (2006.01) |
| C22C 38/46 | (2006.01) |
| C22C 38/48 | (2006.01) |
| C22C 38/50 | (2006.01) |
| E21B 17/00 | (2006.01) |

(52) U.S. Cl.
CPC .............. *C21D 9/085* (2013.01); *C21D 1/18* (2013.01); *C21D 6/004* (2013.01); *C21D 6/005* (2013.01); *C21D 6/008* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C21D 2211/008* (2013.01); *E21B 17/00* (2013.01)

(58) Field of Classification Search
CPC ...................................................... C22C 38/44
See application file for complete search history.

(56) References Cited

U.S. PATENT DOCUMENTS

| | | | | |
|---|---|---|---|---|
| 2004/0154706 A1* | 8/2004 | Buck | ...................... | C22C 38/02 |
| | | | | 148/609 |
| 2017/0029912 A1* | 2/2017 | De Carvalho | .......... | C22C 38/50 |

FOREIGN PATENT DOCUMENTS

| | | |
|---|---|---|
| CN | 1138880 | 12/1996 |
| CN | 101437973 A | 5/2009 |
| CN | 101506400 A | 8/2009 |
| CN | 102534418 A | 7/2012 |
| CN | 105039863 A | 11/2015 |
| CN | 105734453 A | 7/2016 |
| CN | 106661683 A | 5/2017 |
| CN | 107849658 A | 3/2018 |
| CN | 107849661 A | 3/2018 |
| CN | 109234615 A | 1/2019 |
| JP | 1997316611 | 12/1997 |

(Continued)

OTHER PUBLICATIONS

International Search Report for PCT/CN2021/090024 dated Jul. 23, 2021.
International Written Opinion for PCT/CN2021/090024 dated Jul. 23, 2021.
1st & 2nd Substantive Examination Reports from Saudi Arabia (SA) & Notice of Rejection/Reasons of rejections for. App No. 522440923.
OA/Notification of Reasons for Refusal for JP App Np. 2022-562373 dated Jan. 18, 2024.
1st & 2nd Office Actions (dated May 27, 2022 & Nov. 30, 2022) from the State IP Office of P.R.C & Rejection Decision (dated Feb. 15, 2023) for. App No. 202010363059.2.

*Primary Examiner* — Jophy S. Koshy
(74) *Attorney, Agent, or Firm* — Lei Fang, Esq.; Smith Tempel Blaha LLC

(57) ABSTRACT

Disclosed is a high strength, high-temperature corrosion resistant martensitic stainless steel characterized by comprising the following chemical elements in percentages by mass: $0<C\leq0.05\%$, 0.1-0.2% of Si, 0.20-1.0% of Mn, 11.0-14.0% of Cr, 4.0-6.0% of Ni, 1.5-2.5% of Mo, 0.001%-0.10% of N, 0.03-0.2% of V, 0.01-0.1% of Nb, 0.01-0.04% of Al, and the balance being Fe and inevitable impurities. In addition, also disclosed are tubing and casing manufactured from the above-mentioned high strength, high-temperature corrosion resistant martensitic stainless steel, and a method for manufacturing the tubing and the casing. The high strength, high-temperature corrosion resistant martensitic stainless steel of the present disclosure has an excellent high temperature corrosion resistance to carbon dioxide and chloride ions, as well as excellent low-temperature impact toughness and a high-temperature strength degradation resistance.

6 Claims, No Drawings

(56) References Cited

FOREIGN PATENT DOCUMENTS

| | | |
|---|---|---|
| JP | H1161347 A | 3/1999 |
| JP | 2000144337 A | 5/2000 |
| JP | 2000226614 A | 8/2000 |
| JP | 2001179485 A | 7/2001 |
| JP | 20022348610 A | 12/2002 |
| JP | 2006307287 A | 11/2006 |
| JP | 2007332442 A | 12/2007 |
| JP | 2011089159 A | 5/2011 |
| JP | 2017040000 A | 2/2017 |
| JP | 2017510715 A | 4/2017 |
| JP | 2021021087 A | 2/2021 |
| WO | 2001279391 A1 | 10/2001 |
| WO | 2014091756 A | 6/2014 |
| WO | WO-2015127523 A1 * | 9/2015 ............. B22D 7/00 |
| WO | 2014203472 A1 | 2/2017 |
| WO | 2019065115 A1 | 11/2019 |
| WO | 2019065116 A1 | 11/2019 |
| WO | 2019225280 A1 | 5/2020 |
| WO | 2019225281 A1 | 5/2020 |
| WO | 2020095559 A1 | 2/2021 |

* cited by examiner

HIGH STRENGTH, HIGH-TEMPERATURE CORROSION RESISTANT MARTENSITIC STAINLESS STEEL AND MANUFACTURING METHOD THEREFOR

CROSS-REFERENCE TO RELATED APPLICATIONS

This application is a 371 U.S. National Phase of PCT International Application No. PCT/CN2021/090024 filed on Apr. 26, 2021, which claims priority to a Chinese Application No. 202010363059.2 filed on Apr. 30, 2020, the contents of both are incorporated by reference herein in their entireties.

TECHNICAL FIELD

The present disclosure relates to a metallic material and a method for manufacturing the same, in particular to a stainless steel and a method for manufacturing the same.

BACKGROUND

Currently, mining of deep and ultra-deep wells of 6000 meters or above has become a major problem in current oil and gas production. The service environment of tubings and casings in these deep and ultra-deep wells is becoming more and more harsh, mainly including high temperature, high pressure, and a strong corrosive environment with high content of $CO_2$, $Cl^-$, etc. In addition, since many oil and gas resources are located in relatively cold regions, the temperature may reach $-20°$ C. or even lower during operation in winter. For such harsh environments, high alloy products such as super martensitic stainless steel are generally required to meet the corrosion resistance requirements. Although the existing super martensitic stainless steel has excellent corrosion resistance in the environment of high temperature and with high concentration of $CO_2$ and $Cl^-$ ions, for a high-temperature service environment, the strength of the material in the high-temperature service environment of 180° C. or above is also required to meet the safety design requirements of tubings and casings.

Ultra-low carbon martensitic stainless steel traditionally used in tubings and casings mainly comprises 12.5% of Cr, 5.0% of Ni and 2% of Mo. This composition can only be used for 110 ksi tubings and casings. In order to obtain higher grades, higher alloying elements such as Cr and expensive Mo element need to be added.

Chinese patent document CN104884658B, published on Jul. 4, 2017, and entitled "High-strength stainless steel seamless pipe for oil well and manufacturing method thereof" discloses a stainless steel pipe with a multi-phase structure such as ferrite, martensite and austenite, excellent carbon dioxide gas corrosion resistance and sulfide stress corrosion cracking resistance, and a strength up to 110 ksi or even 125 ksi. The stainless steel pipe includes the following chemical components: 0.05% or less of C, 0.5% or less of Si, 0.15-1.0% of Mn, 0.030% or less of P, 0.005% or less of S, 15.5-17.5% of Cr, 3.0-6.0% of Ni, 1.5-5.0% of Mo, 4.0% or less of Cu, 0.1-2.5% of W, and 0.15% or less of N. The high-strength stainless steel seamless pipe with excellent corrosion resistance has excellent carbon dioxide corrosion resistance in a high-temperature environment up to 200° C. and containing $CO_2$ and $Cl^-$, and excellent sulfide stress cracking resistance and excellent sulfide stress corrosion cracking resistance in a corrosive environment further containing $H_2S$. Comparatively speaking, this composition is very difficult to manufacture due to the difficulty of structure control, so that its manufacturing cost is too high for oil fields.

Chinese patent document CN1729306A, published on Feb. 1, 2006, and entitled "High-strength martensitic stainless steel with excellent carbon dioxide gas corrosion resistance and sulfide stress corrosion cracking resistance" discloses a high-strength martensitic stainless steel with excellent carbon dioxide gas corrosion resistance and sulfide stress corrosion cracking resistance, characterized by having a yield strength of 860 MPa or above. The high-strength martensitic stainless steel includes the following chemical components: 0.005-0.04% of C, 0.5% or less of Si, 0.1-3.0% of Mn, 0.04% or less of P, 0.01% or less of S, 10-15% of Cr, 4.0-8% of Ni, 2.8-5.0% of Mo, 0.001-0.10% of Al, 0.07% or less of N, the balance being Fe and impurities, and satisfies the following formula Mo≥2.3-0.89Si+32.2 C. The high-strength martensitic stainless steel has a metal structure mainly composed of tempered martensite, carbides precipitated during tempering, and intermetallic compounds such as a Laves phase or a σ phase finely precipitated during tempering. This steel has the characteristic of high strength, but also has high cost due to the presence of harmful intermetallic compounds such as the σ phase in a precipitated phase and high Mo content.

It can be seen that, the stainless steel disclosed in the prior art mainly relates to the corrosion resistance of stainless steel materials, but does not involve the performance of stainless steel in terms of strength degradation at high-temperature.

SUMMARY

One of the objects of the present disclosure is to provide a high strength, high-temperature corrosion resistant martensitic stainless steel. The high strength, high-temperature corrosion resistant martensitic stainless steel has a yield strength up to 125 ksi, is suitable for application in an environment of 180° C. or above and containing a high concentration of carbon dioxide ($CO_2$), and has excellent high-temperature corrosion resistance to carbon dioxide and chloride ions, excellent low-temperature impact toughness and high-temperature strength degradation resistance.

In order to achieve the above object, the present disclosure provides a high strength, high-temperature corrosion resistant martensitic stainless steel comprising the following chemical elements in percentages by mass: 0<C≤0.05%, 0.1-0.2% of Si, 0.20-1.0% of Mn, 11.0-14.0% of Cr, 4.0-6.0% of Ni, 1.5-2.5% of Mo, 0.001%-0.10% of N, 0.03-0.2% of V, 0.01-0.1% of Nb, and 0.01-0.04% of Al.

Preferably, the high strength, high-temperature corrosion resistant martensitic stainless steel according to the present disclosure comprises the following chemical elements in percentages by mass: 0<C≤0.05%, 0.1-0.2% of Si, 0.20-1.0% of Mn, 11.0-14.0% of Cr, 4.0-6.0% of Ni, 1.5-2.5% of Mo, 0.001%-0.10% of N, 0.03-0.2% of V, 0.01-0.1% of Nb, 0.01-0.04% of Al, and the balance being Fe and inevitable impurity elements.

In the high strength, high-temperature corrosion resistant martensitic stainless steel according to the present disclosure, a design principle of each chemical element is as follows:

C: In the high strength, high-temperature corrosion resistant martensitic stainless steel according to the present disclosure, carbon is used as an austenite-forming element in a steel grade of the martensitic stainless steel. By increasing the C content, the percentage of austenitizing stainless steel at a high temperature can be increased, and then martensite can be obtained at room temperature and the strength of the steel can be improved. However, it should be noted that when the C content in the steel is too high, the corrosion resistance of the stainless steel will be reduced, and the toughness will be reduced at the same time. Therefore, in the high strength, high-temperature corrosion resistant martensitic stainless steel of the present disclosure, the mass percentage of C is controlled to be 0<C≤0.05%

In some preferred embodiments, in order to meet the strength requirements while ensuring the corrosion resistance, the mass percentage of C can be controlled to be 0.003-0.05%.

Si: In the high strength, high-temperature corrosion resistant martensitic stainless steel according to the present disclosure, Si is an important deoxidizer in a steelmaking process. However, Si has the risk of promoting the formation of a σ phase and a ferrite phase in stainless steel with high Cr content, and the σ phase and the ferrite phase have adverse effects on the toughness and corrosion resistance of stainless steel. Therefore, in the high strength, high-temperature corrosion resistant martensitic stainless steel of the present disclosure, the mass percentage of Si is controlled to be 0.1-0.2%.

Mn: In the high strength, high-temperature corrosion resistant martensitic stainless steel according to the present disclosure, Mn can improve the strength of stainless steel. In the present disclosure, in order to ensure the required strength for tubing and casing, 0.2% or more by mass of Mn is added. However, when the mass percentage of Mn exceeds 1.0%, the toughness of the stainless steel will decrease. Therefore, in the high strength, high-temperature corrosion resistant martensitic stainless steel of the present disclosure, the mass percentage of Mn is controlled to be 0.20-1.0%.

In some preferred embodiments, in order to reduce degradation of the corrosion resistance caused by Mn segregation, the mass percentage of Mn can be controlled to be 0.20-0.5%.

Cr: In the high strength, high-temperature corrosion resistant martensitic stainless steel according to the present disclosure, Cr is an important element for improving the corrosion resistance in stainless steel. The addition of Cr can make the surface of stainless steel quickly form a corrosion-resistant passive film in air in time, thereby improving the $CO_2$ corrosion resistance of tubings and casings in a high-temperature environment. In the present disclosure, in order to make the obtained stainless steel has $CO_2$ corrosion resistance at 180° C. or above, the content, in percentage by mass, of Cr added in the high strength, high-temperature corrosion resistant martensitic stainless steel should reach 11.0% or more. However, it should be noted that when the mass percentage of Cr element added in steel exceeds 14.0%, the risk of ferrite precipitation will increase, which will adversely affect the hot workability and corrosion resistance of the product. Therefore, in the high strength, high-temperature corrosion resistant martensitic stainless steel of the present disclosure, the mass percentage of Cr is controlled to be 11.0-14.0%.

In some preferred embodiments, in order to obtain better corrosion resistance, the mass percentage of Cr can be controlled to be 11.5-13.5%.

Ni: In the high strength, high-temperature corrosion resistant martensitic stainless steel according to the present disclosure, Ni is an important element to expand an austenite region in stainless steel. Ni can not only improve the corrosion resistance and toughness of stainless steel, but also effectively improve the stress corrosion cracking resistance of stainless steel under high temperature conditions. In order to obtain this effect, the content of Ni in the high strength, high-temperature corrosion resistant martensitic stainless steel of the present disclosure should be greater than 4.0%. However, it should be noted that Ni is also a relatively precious alloying element. In the high strength, high-temperature corrosion resistant martensitic stainless steel, if the mass percentage of Ni exceeds 6%, an austenite phase of which the strength cannot be controlled by heat treatment appears in the structure, thereby reducing the strength of the stainless steel. Therefore, in the high strength, high-temperature corrosion resistant martensitic stainless steel of the present disclosure, the mass percentage of Ni is controlled to be 4.0-6.0%.

In some preferred embodiments, in order to obtain better corrosion resistance, the mass percentage of Ni can be controlled to be 4.5-5.5%.

Mo: In the high strength, high-temperature corrosion resistant martensitic stainless steel according to the present disclosure, Mo is an element that increases the resistance of stainless steel to pitting corrosion by Cl ions, especially in a high-temperature environment of 150° C. or above. However, it should be noted that Mo is a precious metal element. In addition, when the content of Mo in the high strength, high-temperature corrosion resistant martensitic stainless steel according to the present disclosure exceeds 2.5%, a large amount of ferrite will be formed, thereby adversely affecting both the hot workability and the corrosion resistance of a stainless steel product. Therefore, in the high strength, high-temperature corrosion resistant martensitic stainless steel of the present disclosure, the mass percentage of Mo is controlled to be 1.5-2.5%.

In some preferred embodiments, in order to obtain better corrosion resistance, the mass percentage of Mo can be controlled to be 1.8-2.3%.

N: In the high strength, high-temperature corrosion resistant martensitic stainless steel according to the present disclosure, N is an element that improves the pitting corrosion resistance of stainless steel. Meanwhile, as an austenite-forming element, N can increase the martensite ratio of the stainless steel of the present disclosure, thereby effectively improving the strength of the stainless steel. However, if the content of N element in steel is too high, nitrides are easily formed, which reduces the toughness of the stainless steel. Therefore, in the high strength, high-temperature corrosion resistant martensitic stainless steel of the present disclosure, the mass percentage of N is controlled to be 0.001%-0.10%.

Al: In the high strength, high-temperature corrosion resistant martensitic stainless steel according to the present disclosure, Al is added as a deoxidizer in a smelting process. In order to achieve the effect of deoxidation, the addition amount of Al should be 0.01% or above. However, when the Al content exceeds 0.04%, the toughness of the stainless steel will decrease. Therefore, in the high strength, high-temperature corrosion resistant martensitic stainless steel of the present disclosure, the mass percentage of Al is controlled to be 0.01-0.04%.

V, Nb: In the high strength, high-temperature corrosion resistant martensitic stainless steel according to the present disclosure, both V and Nb are important microalloying elements. Generally speaking, grains can be refined through the pinning effect of carbonitride precipitation, thereby improving the strength of stainless steel. However, the inventors found through detailed research that in the present disclosure, the compound addition of V and Nb can form vanadium niobium carbonitride. The uniform distribution of vanadium niobium carbonitride can improve the strength of stainless steel while refining grains. In order to achieve the above effect, the addition amount of V element in stainless steel must be 0.03% or above, and the addition amount of Nb element must be 0.01% or above. However, on the other hand, V and Nb are noble metal elements, if the addition amount of V element in stainless steel exceeds 0.2% and the addition amount of Nb element exceeds 0.1%, the production cost of an alloy will be greatly increased and the toughness of stainless steel will be reduced. Therefore, in the high strength, high-temperature corrosion resistant martensitic stainless steel of the present disclosure, the mass percentage of V is controlled to be 0.03-0.2%, and the mass percentage of Nb is controlled to be 0.01-0.1%.

Preferably, in the high strength, high-temperature corrosion resistant martensitic stainless steel according to the present disclosure, the content, in percentage by mass, of the chemical elements satisfies: (V+Nb):(C+N)=2:1-8:1, wherein V, Nb, C and N represents the content, in percentage by mass, of the corresponding elements, respectively.

In the above technical solutions, in the high strength, high-temperature corrosion resistant martensitic stainless steel according to the present disclosure, by controlling the content, in percentage by mass, of V, Nb, C and N to satisfy (V+Nb):(C+N)=2:1-8:1, the effects of the above elements on improving and increasing the strength and toughness of stainless steel can be effectively realized.

Preferably, the high strength, high-temperature corrosion resistant martensitic stainless steel according to the present disclosure further comprises at least one of Ti, Zr and Re, wherein the content, in percentage by mass, of any one of Ti, Zr and Re is 0.2% or less; and Ti+Zr+Re≤0.3%. Ti, Zr and Re in the formula represents the content, in percentage by mass, of the corresponding elements, respectively.

In the technical solutions of the present disclosure, the high strength, high-temperature corrosion resistant martensitic stainless steel of the present disclosure further comprises at least one of Ti, Zr and Re, wherein Re may be replaced with other rare earth elements. If one or more of Ti, Zr and Re are contained in the stainless steel, it is conducive to the precipitation of carbonitrides and refinement of grains in the stainless steel, so as to improve the strength and toughness of the stainless steel. However, it should be noted that if the content, in percentage by mass, of any of these elements is greater than 0.2%, the toughness of the stainless steel will be reduced. Thus, in the high strength, high-temperature corrosion resistant martensitic stainless steel of the present disclosure, the content, in percentage by mass, of any one of Ti, Zr and Re is 0.2% or less; and Ti+Zr+Re≤0.3%.

Preferably, in the high strength, high-temperature corrosion resistant martensitic stainless steel according to the present disclosure, the inevitable impurity elements include at least S, P and O, wherein the content, in percentage by mass, of P, S and O satisfies at least one of: P≤0.03%, S≤0.01%, and O≤0.004%.

P: In the high strength, high-temperature corrosion resistant martensitic stainless steel according to the present disclosure, P is a harmful element that reduces the $CO_2$ corrosion resistance of stainless steel at a high temperature, and has an adverse effect on the hot workability of stainless steel. If the percentage content of P exceeds 0.03%, the corrosion resistance of stainless steel will not meet the high-temperature environmental requirements. Therefore, in the high strength, high-temperature corrosion resistant martensitic stainless steel of the present disclosure, the content, in percentage by mass, of P is controlled to be P≤0.03%.

In some preferred embodiments, in order to obtain better corrosion resistance, the mass percentage of P can be controlled to be P≤0.015%.

S: In the high strength, high-temperature corrosion resistant martensitic stainless steel according to the present disclosure, S is a harmful element that reduces the hot workability of stainless steel and adversely affects the impact toughness of stainless steel. If the mass percentage of S exceeds 0.01%, a steel pipe cannot be manufactured normally. Therefore, in the high strength, high-temperature corrosion resistant martensitic stainless steel of the present disclosure, the content, in percentage by mass, of S is controlled to be S≤0.01%.

In some preferred embodiments, in order to obtain better corrosion resistance, the mass percentage of S can be controlled to be S≤0.005%.

O: In the high strength, high-temperature corrosion resistant martensitic stainless steel according to the present disclosure, the O element exists in steel as an oxide, which has adverse effects on the hot workability, impact toughness and corrosion resistance of stainless steel. Therefore, in the high strength, high-temperature corrosion resistant martensitic stainless steel of the present disclosure, the content, in percentage by mass, of O is controlled to be O≤0.004%.

Preferably, in the high strength, high-temperature corrosion resistant martensitic stainless steel according to the present disclosure, in order to obtain high strength and high temperature corrosion resistance, the content, in percentage by mass, of the chemical elements satisfies at least one of:
0.003-0.05% of C;
0.20-0.5% of Mn;
11.5-13.5% of Cr;
4.5-5.5% of Ni; and
1.8-2.3% of Mo.

Preferably, the high strength, high-temperature corrosion resistant martensitic stainless steel according to the present disclosure has at least one of the following properties: a yield strength greater than or equal to 862 MPa at room temperature (i.e. up to 125 ksi); a yield strength greater than or equal to 800 MPa at 180° C.; an impact energy at −20° C. greater than or equal to 140 J; and a uniform corrosion rate smaller than or equal to 0.125 mm/a in the environments containing $CO_2$ and high $Cl^-$ concentration at 180° C. The environment containing $CO_2$ has, for example, a $CO_2$ partial pressure of 2 MPa or more, for example, 6 MPa. The environment containing high $Cl^-$ concentration contains, for example, a chloride ion concentration of 50000 mg/L or more, for example, a chloride ion concentration of 100000 mg/L.

Accordingly, another object of the present disclosure is to provide tubing and casing having a yield strength up to 125 ksi. The tubing and the casing are suitable for application in environments with a temperature of 180° C. or more and a high concentration of carbon dioxide ($CO_2$) with a partial pressure of carbon dioxide ($CO_2$) of 2 MPa or above, and has excellent high temperature corrosion resistance to carbon dioxide and chloride ions, excellent low-temperature impact toughness, high yield strength even at 180° C. or above, i.e., strength degradation resistance at a high-temperature, and significant advantages of high strength, high toughness, and high corrosion resistance.

In order to achieve the above object, the present disclosure provides tubing and casing manufactured from the high strength, high-temperature corrosion resistant martensitic stainless steel as described above.

Accordingly, a further object of the present disclosure is to provide a method for manufacturing the tubing and the casing as described above. The tubing and the casing obtained by this manufacturing method has a yield strength up to 125 ksi, is suitable for application in an environment of 180° C. or above and with a high concentration carbon dioxide ($CO_2$), and has excellent high temperature corrosion resistance to carbon dioxide and chloride ions, excellent low-temperature impact toughness and high-temperature strength degradation resistance, as well as significant advantages of high strength, high toughness, and high corrosion resistance.

In order to achieve the above object, the present disclosure provides a method for manufacturing the tubing and the casing as described above, including the steps of:

(1) manufacturing a pipe blank;

(2) manufacturing a seamless pipe from the pipe blank, and then cooling the seamless pipe to room temperature;

(3) quenching: heating the seamless pipe to a temperature of Ac3 to 1050° C., and performing heat preservation for t×(0.5-3) min; and then cooling the seamless pipe at a cooling rate of 2-40° C./s to a temperature of T1, and performing heat preservation for t×(0.5-1.5) min, wherein T1=Ms−80° C., wherein Ms is a temperature at which martensite transformation starts;

(4) first tempering: heating the seamless pipe to a temperature of T2 for tempering treatment and performing heat preservation for t×(3-7) min, then cooling the seamless pipe to 100° C. or less at a cooling rate of 5-30° C./s, wherein T2 ranges from 500° C. to Ac3; and (5) second tempering: heating the seamless pipe to a temperature of T3 for second tempering treatment and performing heat preservation for t×(3-7) min, then cooling the seamless pipe to 100° C. or less at a cooling rate of 5-30° C./s, wherein T3=T2−40° C.;

wherein t denotes a wall thickness in mm, and Ac3 is a temperature at which austenite transformation of the steel ends.

In the method for manufacturing the tubing and the casing according to the present disclosure, in the step (1), the pipe blank may be manufactured by a conventional smelting method using such as a converter, an electric furnace, a vacuum induction furnace and the like through continuous casting, ingot casting, and the like. In the step (2), in the process of manufacturing the seamless pipe from the pipe blank, the pipe blank is rolled into a seamless steel pipe of a specified size by using a commonly used Mannesmann pipe mill, and then the manufactured seamless steel pipe is cooled to room temperature.

In the step (3), the reason why the heating temperature of the seamless pipe is controlled to be Ac3 to 1050° C. is that if the heating is performed at a temperature below Ac3, the stainless steel of the present disclosure cannot be sufficiently austenitized, which makes it difficult to obtain uniform precipitation in the stainless steel in subsequent treatment. In some preferred embodiments, heating is preferably performed at a temperature of 1000° C. or less. If the quenching heating temperature is above 1000° C., an austenitic structure grows, thereby deteriorating the impact toughness of the stainless steel. Furthermore, in the step (3), after the stainless steel is fully austenitized and heat preservation is performed, a heat preservation process is performed at T1 during a cooling process, so that carbides of V and Nb can be fully dispersed in a retained austenite between martensitic laths, and at the same time, the reduction of the C content in the martensitic laths can effectively improve the toughness and plasticity of a martensitic matrix. In the subsequent heat preservation process at a tempering temperature of T2 in the step (4), a reversed austenite is formed between the martensitic laths, and the carbides of V and Nb migrate into the reversed austenite, thereby improving the strength of the stainless steel.

Its metallographic structure is the reversed austenite and the retained austenite formed between a martensitic lath base and part of lath boundaries. Then, in the step (5) in the above solution, the second tempering treatment can transform the undecomposed martensite in the first tempering to form a new reversed austenite, which can improve the room temperature strength, low-temperature impact toughness and the strength at 180° C. or above of the stainless steel while reducing the hardness of the stainless steel.

Compared with the traditional ultra-low carbon martensitic stainless steel without compound addition of Nb and V, and the quenching and tempering process, the technical solution of the present disclosure can significantly improve the strength, toughness and plasticity. In addition, due to the more uniform distribution of carbides, the structure after tempering is finer, which improves the strength and corrosion resistance of the steel in long-term service at a high temperature of 180° C.

Preferably, in the method for manufacturing the tubing and the casing according to the present disclosure, in the step (3), the heating temperature is Ac3 to 1000° C.

Compared with the prior art, the high strength, high-temperature corrosion resistant martensitic stainless steel and the manufacturing method therefor have the following advantages and beneficial effects:

Through a reasonable chemical composition system design, the present disclosure provides a high strength, high-temperature corrosion resistant martensitic stainless steel, which has a yield strength up to 125 ksi, is suitable for application in an environment of 180° C. or above and with a high concentration carbon dioxide ($CO_2$), and has excellent high temperature corrosion resistance to carbon dioxide and chloride ions, as well as excellent low-temperature impact toughness and high-temperature strength degradation resistance.

In addition, the tubing and the casing manufactured from the high strength, high-temperature corrosion resistant martensitic stainless steel of the present disclosure also have excellent properties, with the significant advantages of high strength, high toughness, and high corrosion resistance, and can be effectively applied in numerous harsh environments.

DETAILED DESCRIPTION

The high strength, high-temperature corrosion resistant martensitic stainless steel and the manufacturing method therefor according to the present disclosure will be further explained and illustrated below in connection with the specific examples, which, however, do not unduly limit the technical solution of the present invention.

Examples 1-15 and Comparative Examples 1-7

Table 1 lists the mass percentage of chemical elements in high strength, high-temperature corrosion resistant martensitic stainless steel of Examples 1-15 and stainless steel of Comparative Examples 1-7.

TABLE 1

(%, the balance is Fe and other inevitable impurities other than P, S and O)

Chemical element

| | Grade | C | Si | Mn | Cr | Ni | Mo | N | V | Nb | Al | P | S | O | Ti | Zr | Re | (V + Nb):(C + N) |
|---|---|---|---|---|---|---|---|---|---|---|---|---|---|---|---|---|---|---|
| Example 1 | A1 | 0.038 | 0.17 | 0.42 | 13.61 | 5.29 | 1.81 | 0.044 | 0.095 | 0.077 | 0.03 | 0.002 | 0.003 | 0.002 | — | 0.09 | — | 2.1 |
| Example 2 | A2 | 0.002 | 0.19 | 0.88 | 13.88 | 4.25 | 2.46 | 0.087 | 0.188 | 0.082 | 0.03 | 0.008 | 0.006 | 0.001 | 0.15 | — | — | 3.0 |
| Example 3 | A3 | 0.014 | 0.16 | 0.79 | 12.65 | 5.59 | 2.26 | 0.056 | 0.047 | 0.091 | 0.02 | 0.026 | 0.008 | 0.001 | — | — | 0.13 | 2.0 |
| Example 4 | A4 | 0.021 | 0.19 | 0.49 | 12.32 | 5.18 | 1.97 | 0.080 | 0.171 | 0.086 | 0.03 | 0.021 | 0.001 | 0.002 | — | — | 0.18 | 2.5 |
| Example 5 | A5 | 0.044 | 0.18 | 0.61 | 13.47 | 4.52 | 1.75 | 0.028 | 0.187 | 0.066 | 0.04 | 0.011 | 0.005 | 0.003 | — | — | 0.18 | 3.5 |
| Example 6 | A6 | 0.004 | 0.11 | 0.52 | 11.88 | 4.01 | 2.34 | 0.020 | 0.031 | 0.068 | 0.02 | 0.015 | 0.003 | 0.002 | — | 0.06 | — | 4.1 |
| Example 7 | A7 | 0.008 | 0.16 | 0.38 | 11.77 | 4.70 | 1.56 | 0.081 | 0.165 | 0.042 | 0.02 | 0.027 | 0.009 | 0.003 | 0.19 | — | — | 2.3 |
| Example 8 | A8 | 0.010 | 0.16 | 0.37 | 13.72 | 4.89 | 2.20 | 0.025 | 0.048 | 0.077 | 0.03 | 0.011 | 0.001 | 0.003 | — | — | 0.14 | 3.6 |
| Example 9 | A9 | 0.018 | 0.14 | 0.82 | 11.10 | 5.52 | 1.68 | 0.011 | 0.126 | 0.087 | 0.03 | 0.028 | 0.007 | 0.001 | — | — | 0.16 | 7.3 |
| Example 10 | A10 | 0.018 | 0.16 | 0.74 | 13.80 | 4.73 | 1.83 | 0.013 | 0.062 | 0.068 | 0.03 | 0.016 | 0.005 | 0.002 | — | 0.09 | — | 4.2 |
| Example 11 | A11 | 0.023 | 0.16 | 0.45 | 13.04 | 4.39 | 2.20 | 0.011 | 0.121 | 0.071 | 0.04 | 0.005 | 0.002 | 0.001 | 0.15 | — | — | 5.6 |
| Example 12 | A12 | 0.046 | 0.16 | 0.25 | 12.94 | 4.23 | 2.49 | 0.008 | 0.186 | 0.021 | 0.01 | 0.010 | 0.006 | 0.001 | — | — | 0.16 | 3.8 |
| Example 13 | A13 | 0.033 | 0.12 | 0.32 | 11.56 | 5.27 | 1.83 | 0.084 | 0.148 | 0.086 | 0.02 | 0.004 | 0.003 | 0.002 | — | 0.09 | — | 2.0 |
| Example 14 | A14 | 0.043 | 0.18 | 0.23 | 11.27 | 4.85 | 1.64 | 0.037 | 0.102 | 0.063 | 0.04 | 0.019 | 0.004 | 0.003 | — | — | 0.18 | 2.1 |
| Example 15 | A15 | 0.013 | 0.17 | 0.60 | 11.38 | 4.68 | 2.40 | 0.047 | 0.194 | 0.018 | 0.03 | 0.008 | 0.001 | 0.002 | — | 0.06 | — | 3.5 |
| Comparative Example 1 | B1 | 0.005 | 0.17 | 0.77 | 14.9 | 4.33 | 2.45 | 0.003 | 0.192 | 0.039 | 0.02 | 0.003 | 0.003 | 0.002 | — | — | — | 28.9 |
| Comparative Example 2 | B2 | 0.004 | 0.15 | 0.43 | 13.68 | 4.32 | 1.42 | 0.048 | — | 0.018 | 0.04 | 0.025 | 0.006 | 0.001 | — | — | — | 0.35 |
| Comparative Example 3 | B3 | 0.049 | 0.15 | 0.91 | 12.86 | 3.91 | 2.34 | 0.089 | 0.058 | — | 0.04 | 0.016 | 0.003 | 0.001 | — | — | — | 0.42 |
| Comparative Example 4 | B1 | 0.005 | 0.17 | 0.77 | 14.9 | 4.33 | 2.45 | 0.003 | 0.192 | 0.039 | 0.02 | 0.003 | 0.003 | 0.002 | — | — | — | 28.9 |
| Comparative Example 5 | B2 | 0.004 | 0.15 | 0.43 | 13.68 | 4.32 | 1.42 | 0.048 | — | 0.018 | 0.04 | 0.025 | 0.006 | 0.001 | — | — | — | 0.35 |
| Comparative Example 6 | B3 | 0.049 | 0.15 | 0.91 | 12.86 | 3.91 | 2.34 | 0.089 | 0.058 | — | 0.04 | 0.016 | 0.003 | 0.001 | — | — | — | 0.42 |

Tubings manufactured from the high strength, high-temperature corrosion resistant martensitic stainless steel of Examples 1-15 and tubings manufactured from the stainless steel of Comparative examples 1-3 were manufactured by the following steps:

(1) a pipe blank was manufactured;
(2) a seamless pipe with an outer diameter of 88.9 mm and a wall thickness of 7.34 mm was manufactured from the pipe blank, and then cooled to room temperature;
(3) quenching: the seamless pipe was heated to a temperature of Ac3 to 1050° C., preferably Ac3 to 1000° C., and heat preservation was performed for t×(0.5-3) min, denoted by the first heat preservation time; and the seamless pipe was subsequently cooled at a cooling rate of 2-40° C./s to a temperature of T1, and heat preservation was performed for t×(0.5-1.5) min, denoted by the second heat preservation time, wherein T1=Ms−80° C., wherein Ms is the temperature at which martensite transformation starts;
(4) first tempering: the seamless pipe was heated to a temperature of T2 again for tempering treatment and heat preservation was performed for t×(3-7) min, denoted by the third heat preservation time, followed by cooling to 100° C. or less at a cooling rate of 5-30° C./s, wherein T2 ranges from 500° C. to Ac3; and
(5) second tempering: second tempering treatment was performed at a temperature of T3 and heat preservation was performed for t×(3-7) min, denoted by the fourth heat preservation time, followed by cooling to 100° C. or less at a cooling rate of 5-30° C./s, wherein T3=T2−40° C.;

wherein t denotes a wall thickness in mm.

It should be noted that, with reference to Table 1, grades of the stainless steel of Comparative Examples 4-6 respectively correspond to grades of Comparative Examples 1-3, namely B1-B3. For the stainless steel pipes of Comparative Examples 4-6, only the conventional heat treatment method was used, that is, the seamless pipe was heated at 1000° C. for 30 min, air-cooled to room temperature, and then subjected to once tempering heat treatment at 600° C. and heat preserved for 40 min.

Tables 2-1 and 2-2 list the specific process parameters for each step of the manufacturing method of Examples 1-15 and Comparative Examples 1-3.

TABLE 2-1

| | | | | Step (3) | | | | |
|---|---|---|---|---|---|---|---|---|
| | Ac3 (° C.) | Ms (° C.) | Wall thickness t (mm) | Heating temperature (° C.) | First heat preservation time (min) | Cooling rate (° C./s) | T1 (° C.) | Second heat preservation Time (min) |
| Example 1 | 855 | 238 | 7.34 | 880 | 20 | 5 | 158 | 4 |
| Example 2 | 892 | 250 | 7.34 | 900 | 15 | 7 | 170 | 4 |
| Example 3 | 879 | 240 | 7.34 | 880 | 20 | 10 | 160 | 8 |
| Example 4 | 872 | 260 | 7.34 | 900 | 15 | 30 | 180 | 8 |
| Example 5 | 862 | 246 | 7.34 | 880 | 20 | 15 | 166 | 10 |

TABLE 2-1-continued

|  | Ac3 (° C.) | Ms (° C.) | Wall thickness t (mm) | Step (3) | | | | |
|---|---|---|---|---|---|---|---|---|
|  |  |  |  | Heating temperature (° C.) | First heat preservation time (min) | Cooling rate (° C./s) | T1 (° C.) | Second heat preservation Time (min) |
| Example 6 | 891 | 289 | 7.34 | 900 | 15 | 22 | 209 | 10 |
| Example 7 | 877 | 287 | 7.34 | 940 | 10 | 40 | 207 | 8 |
| Example 8 | 892 | 254 | 7.34 | 960 | 4 | 30 | 174 | 8 |
| Example 9 | 858 | 262 | 7.34 | 880 | 20 | 15 | 182 | 7 |
| Example 10 | 876 | 244 | 7.34 | 880 | 20 | 10 | 170 | 7 |
| Example 11 | 889 | 264 | 7.34 | 900 | 15 | 22 | 184 | 5 |
| Example 12 | 888 | 262 | 7.34 | 920 | 12 | 15 | 182 | 5 |
| Example 13 | 856 | 268 | 7.34 | 940 | 10 | 20 | 188 | 8 |
| Example 14 | 854 | 279 | 7.34 | 880 | 20 | 25 | 199 | 8 |
| Example 15 | 899 | 277 | 7.34 | 960 | 4 | 3 | 197 | 4 |
| Comparative Example 1 | 915 | 238 | 7.34 | 940 | 10 | 5 | 194 | 7 |
| Comparative Example 2 | 883 | 272 | 7.34 | 900 | 15 | 9 | 188 | 8 |
| Comparative Example 3 | 886 | 248 | 7.34 | 880 | 20 | 10 | 149 | 10 |
| Comparative Example 4 | 915 | 238 | 7.34 | 1000 | 30 | Air cooling, not controlled | | |
| Comparative Example 5 | 883 | 272 | 7.34 | 1000 | 30 | Air cooling, not controlled | | |
| Comparative Example 6 | 886 | 248 | 7.34 | 1000 | 30 | Air cooling, not controlled | | |

TABLE 2-2

|  | Step (4) | | | | Step (5) | | | |
|---|---|---|---|---|---|---|---|---|
|  | T2 (° C.) | Third heat preservation time (min) | Cooling rate (° C./s) | Cooling temperature (° C.) | T3 (° C.) | Fourth heat preservation Time (min) | Cooling rate (° C./s) | Cooling temperature (° C.) |
| Example 1 | 600 | 50 | 5 | 25 | 560 | 25 | 5 | 25 |
| Example 2 | 600 | 40 | 5 | 50 | 560 | 30 | 5 | 25 |
| Example 3 | 600 | 40 | 5 | 60 | 560 | 35 | 5 | 25 |
| Example 4 | 610 | 40 | 5 | 25 | 570 | 35 | 5 | 25 |
| Example 5 | 610 | 30 | 5 | 25 | 570 | 50 | 10 | 25 |
| Example 6 | 610 | 30 | 5 | 40 | 570 | 40 | 10 | 25 |
| Example 7 | 610 | 40 | 10 | 50 | 570 | 40 | 10 | 25 |
| Example 8 | 620 | 25 | 10 | 25 | 580 | 50 | 15 | 25 |
| Example 9 | 620 | 25 | 10 | 70 | 580 | 50 | 15 | 25 |
| Example 10 | 620 | 30 | 10 | 25 | 580 | 35 | 15 | 25 |
| Example 11 | 610 | 40 | 10 | 80 | 570 | 35 | 20 | 25 |
| Example 12 | 610 | 30 | 30 | 25 | 570 | 25 | 20 | 25 |
| Example 13 | 620 | 30 | 30 | 60 | 580 | 35 | 30 | 25 |
| Example 14 | 620 | 25 | 10 | 25 | 580 | 25 | 30 | 25 |
| Example 15 | 620 | 25 | 10 | 30 | 580 | 35 | 10 | 25 |
| Comparative Example 1 | 600 | 40 | 10 | 25 | 560 | 35 | 10 | 25 |
| Comparative Example 2 | 600 | 30 | 10 | 50 | 560 | 45 | 10 | 25 |
| Comparative Example 3 | 610 | 25 | 10 | 25 | 570 | 35 | 10 | 25 |
| Comparative Example 4 | 600 | 40 | Air cooling, not controlled | 25 | | | | |
| Comparative Example 5 | 600 | 40 | Air cooling, not controlled | 25 | | | | |
| Comparative Example 6 | 600 | 40 | Air cooling, not controlled | 25 | | | | |

The related properties such as yield strength YS and tensile strength TS and impact toughness of the tubings manufactured from the high strength, high-temperature corrosion resistant martensitic stainless steel of Examples 1-15 and from the stainless steel of Comparative examples 1-7 were tested to obtain test data for evaluating their properties, respectively, and the specific test items and test methods are as follows:

1) Yield strength and tensile strength test: the manufactured steel pipes were processed into API arc specimens, and yield strength test data was obtained by taking an average after testing according to the ISO 6892 standard.
2) High temperature yield strength test: the manufactured steel pipes were processed into near-arc specimens and subjected to a high temperature tensile test according to the ISO 6892 standard and the yield strength was obtained by taking an average.
3) Charpy V-notch impact absorbing energy (i.e., impact toughness) test: V-notch impact specimens with a volume of 5*10*55 (mm) were taken from steel pipes, and an average was taken after testing according to the GB/T 229 standard and converted to that of a full size of 10*10*55 (mm) according to the API 5CT standard, wherein a test temperature is −20° C.

4) Corrosion test in the presence of $CO_2$ and $Cl^-$ at a high temperature: test specimens were immersed in liquid in an autoclave at a temperature of 180° C. with a $CO_2$ partial pressure of 6 MPa, a $Cl^-$ concentration of 100000 mg/L and a liquid flow rate of 1 m/s. The test duration was 240 h. The uniform corrosion rate was calculated by comparing the weights of the test specimens before and after the test.

Table 3 lists the relevant performance parameters for the tubings manufactured from Examples 1-15 and Comparative Examples 1-7.

TABLE 3

| | Strength | | Yield strength at 180° C. (MPa) | Impact toughness at −20° C. (J) | Uniform corrosion rate (mm/a) |
|---|---|---|---|---|---|
| | YS (MPa) | TS (MPa) | | | |
| Example 1 | 882 | 912 | 810 | 163 | 0.051 |
| Example 2 | 963 | 1002 | 848 | 143 | 0.086 |
| Example 3 | 908 | 956 | 800 | 161 | 0.079 |
| Example 4 | 948 | 981 | 843 | 151 | 0.062 |
| Example 5 | 981 | 1015 | 861 | 157 | 0.094 |
| Example 6 | 962 | 995 | 848 | 153 | 0.019 |
| Example 7 | 993 | 1025 | 878 | 149 | 0.085 |
| Example 8 | 970 | 1001 | 850 | 165 | 0.062 |
| Example 9 | 989 | 1037 | 879 | 145 | 0.115 |
| Example 10 | 934 | 965 | 834 | 163 | 0.080 |
| Example 11 | 924 | 964 | 831 | 166 | 0.100 |
| Example 12 | 872 | 902 | 808 | 145 | 0.072 |
| Example 13 | 996 | 1043 | 877 | 149 | 0.080 |
| Example 14 | 905 | 947 | 820 | 162 | 0.109 |
| Example 15 | 875 | 921 | 810 | 153 | 0.090 |
| Comparative Example 1 | 926 | 964 | 814 | 114 | 0.173 |
| Comparative Example 2 | 929 | 973 | 817 | 102 | 0.166 |
| Comparative Example 3 | 930 | 970 | 818 | 108 | 0.185 |
| Comparative Example 4 | 872 | 915 | 747 | 97 | 0.121 |
| Comparative Example 5 | 905 | 937 | 760 | 88 | 0.138 |
| Comparative Example 6 | 882 | 917 | 755 | 86 | 0.143 |

As can be seen from Table 3, in Examples 1-15 of the present disclosure, the yield strength YS is 862 MPa or above, meeting 125 ksi requirements, and the yield strength at 180° C. is greater than or equal to 810 MPa; the impact toughness at −20° C. is greater than or equal to 143 J; and the uniform corrosion rate is smaller than or equal to 0.115 mm/a in the environments containing $CO_2$ and high $Cl^-$ concentration at 180° C. It can be seen that Examples 1-15 of the present disclosure have the advantage of better comprehensive performance compared with Comparative Examples 1-3 and Comparative Examples 4-6. The components in Comparative Examples 1-3 are outside the scope of the present disclosure, wherein the content of Cr element in Comparative Example 1, the content of Mo element in Comparative Example 2, and the content of Ni element in Comparative Example 3 are outside the scope of the present disclosure, and (V+Nb):(C+N) is outside the range of 2:1 to 8:1, resulting in an average corrosion rate of 0.125 mm/a or above and low toughness. In Comparative Examples 4-6, in addition to that the components are outside the scope of the present disclosure, the quenching method and the tempering method are outside the scope of the manufacturing method of the present disclosure, the toughness is further reduced, and the yield strength at high temperature is low. Therefore, compared with the comparative examples, the tubings manufactured from Examples 1-15 of the present disclosure have the significant advantages of excellent high temperature corrosion resistance to carbon dioxide and chloride ions, as well as excellent low-temperature impact toughness and high-temperature strength degradation resistance.

It should be noted that the above-mentioned examples are merely illustrations of specific examples of the present invention. Obviously, the present invention is not limited to the above examples, but has many similar variations or modifications. All variations or modifications that can be directly derived or easily thought of by those skilled in the art from the contents disclosed in the present disclosure are intended to be within the protection scope of the present invention.

What is claimed is:

1. A martensitic stainless steel, comprising the following chemical elements in percentages by mass: 0<C≤0.05%, 0.1-0.2% of Si, 0.20-1.0% of Mn, 11.0-14.0% of Cr, 4.0-6.0% of Ni, 1.5-2.5% of Mo, 0.001%-0.10% of N, 0.03-0.2% of V, 0.01-0.1% of Nb, 0.01-0.04% of Al, and the balance being Fe and inevitable impurity elements; wherein the content, in percentage by mass, of the chemical elements satisfies: (V+Nb):(C+N)=2:1-8:1; the stainless steel has the following properties: a yield strength greater than or equal to 862 MPa at room temperature; a yield strength greater than or equal to 800 MPa at 180° C.; an impact energy at −20° C. greater than or equal to 140 J; and a uniform corrosion rate smaller than or equal to 0.125 mm/a in an environment at a temperature of 180° C. with a $CO_2$ partial pressure of 6 MPa and a $Cl^-$ concentration of 100000 mg/L.

2. The martensitic stainless steel of claim 1, further comprising at least one of Ti, Zr and Re, wherein the content, in percentage by mass, of any one of Ti, Zr and Re is 0.2% or less; and 0<Ti+Zr+Re≤0.3%.

3. The martensitic stainless steel of claim 1, wherein the inevitable impurity elements comprise at least S, P and O, wherein the content, in percentage by mass, of P, S and O satisfies 0<P<0.03%, 0<S≤0.01%, and 0<O≤0.004%.

4. The martensitic stainless steel of claim 1, wherein the content, in percentage by mass, of the chemical elements satisfies at least one of:
0.003-0.05% of C;
0.20-0.5% of Mn;
11.5-13.5% of Cr;
2.5-5.5% of Ni; and
1.8-2.3% of Mo.

5. A method for manufacturing a tubing and casing, comprising the steps of:
(1) manufacturing a pipe blank from the martensitic stainless steel of claim 1;
(2) manufacturing a seamless pipe from the pipe blank, and then cooling the seamless pipe to room temperature;
(3) quenching by heating the seamless pipe to a temperature of Ac3 to 1050° C., and performing heat preservation for t×(0.5-3) min; and then cooling the seamless pipe at a cooling rate of 2-40° C./s to a temperature of $T_1$, and performing heat preservation for t×(0.5-1.5) min, wherein $T_1$=Ms−80° C., wherein Ms is a temperature at which martensite transformation starts;

(4) first tempering by heating the seamless pipe to a temperature of $T_2$ for tempering treatment and performing heat preservation for t×(3-7) min, then cooling the seamless pipe to 100° C. or less at a cooling rate of 5-30° C./s, wherein $T_2$ ranges from 500° C. to Ac3; and
(5) second tempering by heating the seamless pipe to a temperature of $T_3$ for second tempering treatment and performing heat preservation for t×(3-7) min, then cooling the seamless pipe to 100° C. or less at a cooling rate of 5-30° C./s, wherein $T_3=T_2-40°$ C.;
wherein t denotes a wall thickness in mm.

6. The method for manufacturing the tubing and the casing of claim 5, wherein in the step (3), heating the seamless pipe to a temperature of Ac3 to 1000° C.

\* \* \* \* \*